(12) United States Patent
Rutgersson et al.

(10) Patent No.: US 10,953,840 B2
(45) Date of Patent: Mar. 23, 2021

(54) KNEE AIRBAG ARRANGEMENT COMPRISING EXTERNAL TETHER

(71) Applicant: Volvo Car Corporation, Gothenburg (SE)

(72) Inventors: Sebastian Rutgersson, Gothenburg (SE); Johan Rosenberg, Lerum (SE)

(73) Assignee: Volvo Car Corporation, Gothenburg (SE)

( * ) Notice: Subject to any disclaimer, the term of this patent is extended or adjusted under 35 U.S.C. 154(b) by 56 days.

(21) Appl. No.: 16/443,975

(22) Filed: Jun. 18, 2019

(65) Prior Publication Data
US 2020/0017061 A1 Jan. 16, 2020

(30) Foreign Application Priority Data
Jul. 13, 2018 (EP) ..................................... 18183436

(51) Int. Cl.
| | |
|---|---|
| *B60R 21/2338* | (2011.01) |
| *B60R 21/206* | (2011.01) |
| *B60R 21/233* | (2006.01) |
| *B60R 21/237* | (2006.01) |
| *B60R 21/00* | (2006.01) |

(Continued)

(52) U.S. Cl.
CPC ........ *B60R 21/2338* (2013.01); *B60R 21/206* (2013.01); *B60R 21/233* (2013.01); *B60R 21/237* (2013.01); *B60R 2021/0051* (2013.01); *B60R 2021/01238* (2013.01);
(Continued)

(58) Field of Classification Search
CPC . B60R 21/2338; B60R 21/206; B60R 21/233; B60R 21/237; B60R 2021/0051; B60R 2021/01238; B60R 2021/23107; B60R 2021/23169; B60R 2021/23386; B60R 2021/23388; B60R 21/015; B60R 21/231
See application file for complete search history.

(56) References Cited

U.S. PATENT DOCUMENTS

| | | | | |
|---|---|---|---|---|
| 7,293,799 | B2 * | 11/2007 | Fellhauer | B60R 21/231 |
| | | | | 280/743.1 |
| 7,942,443 | B2 * | 5/2011 | Dennis | B60R 21/2338 |
| | | | | 280/743.2 |

(Continued)

OTHER PUBLICATIONS

Nov. 30, 2018 European Search Report issue on International Application No. EP18183436.

*Primary Examiner* — Drew J Brown
(74) *Attorney, Agent, or Firm* — Clements Bernard Walker; Christopher L. Bernard (57) ABSTRACT

A knee airbag arrangement for a vehicle. The knee airbag arrangement includes an inflatable airbag and an external tether. The airbag is adapted to be inflated to a position between an instrument panel of the vehicle and a knee/shin region of a vehicle occupant. The knee airbag is adapted to form a first deployment mode or a second deployment mode when in a deployed state. The external tether controls deployment of the airbag to the second deployment mode. The depth ($D_2$) of the airbag in the second deployment mode is greater than a depth ($D_1$) of the knee airbag in the first deployment mode. A depth of the airbag in a deployed state is a greatest extent of the airbag perpendicular to the instrument panel in the knee/shin region.

15 Claims, 3 Drawing Sheets

(51) Int. Cl.
   *B60R 21/01*   (2006.01)
   *B60R 21/231*   (2011.01)
(52) U.S. Cl.
   CPC ............... *B60R 2021/23107* (2013.01); *B60R 2021/23169* (2013.01); *B60R 2021/23386* (2013.01)

(56) References Cited

U.S. PATENT DOCUMENTS

| | | | |
|---|---|---|---|
| 2003/0132617 A1* | 7/2003 | Takimoto | B60R 21/2346 280/730.1 |
| 2005/0151351 A1* | 7/2005 | Enders | B60R 21/233 280/730.1 |
| 2005/0206138 A1* | 9/2005 | Breuninger | B60R 21/231 280/729 |
| 2006/0249943 A1* | 11/2006 | Bauer | B60R 21/231 280/743.2 |
| 2007/0205590 A1 | 9/2007 | Klinkenberger et al. | |
| 2009/0134611 A1* | 5/2009 | Wigger | B60R 21/231 280/730.1 |
| 2012/0007348 A1* | 1/2012 | Wehner | B60R 21/231 280/730.1 |
| 2016/0311392 A1 | 10/2016 | Jindal et al. | |
| 2017/0240132 A1* | 8/2017 | Schneider | B60R 21/2338 |
| 2017/0334386 A1 | 11/2017 | Park et al. | |

\* cited by examiner

KNEE AIRBAG ARRANGEMENT COMPRISING EXTERNAL TETHER

CROSS-REFERENCE TO RELATED APPLICATION

The present disclosure claims the benefit of priority of co-pending European Patent Application No. 18183436.7, filed on Jul. 13, 2018, and entitled "KNEE AIRBAG ARRANGEMENT COMPRISING EXTERNAL TETHER," the contents of which are incorporated in full by reference herein.

TECHNICAL FIELD

The present invention relates to a knee airbag arrangement for a vehicle. The present invention further relates to a vehicle comprising the knee airbag arrangement. The present invention also relates to a method for deploying an airbag of the knee airbag arrangement.

BACKGROUND

A vehicle may be equipped with a knee airbag for protection of the knee/shin region of the vehicle occupant during a collision. The knee airbag in its inflated position is intended to restrain the knee/shin region of the vehicle occupant and thereby protect the vehicle occupant from colliding with an interior object such as the instrument panel in front of the seat. It is known various knee airbags aiming at providing protection for different sized vehicle occupants and different crash modes.

With the introduction of vehicles with AD capabilities, i.e. autonomous drive capabilities, there is a potential for the occupants to move and adjust the vehicle seat even more freely than is possible today. In particular, a more retracted, as well as reclined position, than allowed today may be desirable, or at least more frequently used, in particular by a driver of the vehicle when the vehicle is driving autonomously.

Hence, the development of AD vehicles poses new challenges to inflatable restraint devices, such as a knee airbag. A vehicle occupant may be seated further away from the instrument panel and potentially also in a more reclined position when the vehicle is in an autonomous driving mode. Thus, the adjustable range of the vehicle seat in the vehicle may be increased further rearwards in the vehicle. In this way, a deployment configuration of existing/current knee airbag may be insufficient for achieving the desired early interaction between the knee/shin region of a vehicle occupant and a knee airbag in the event of a collision. Meanwhile, it is anticipated that the vehicle will be driven in both manual and autonomous driving mode, thus still requiring a deployment of a knee airbag adapted for vehicle occupants seated for manual driving.

As may be realized from above, there is a desire to improve knee/shin protection for a vehicle occupant during a collision when the vehicle occupant is situated further rearwards in the vehicle, as may occur when a vehicle is in autonomous driving mode, whilst maintaining an appropriate protection for the knee/shin region of vehicle occupant seated for manual driving of the vehicle.

SUMMARY

The object of the present invention is to overcome or ameliorate at least one of the disadvantages of the prior art, or to provide a useful alternative.

It is desirable to provide a knee airbag arrangement being able to perform the dual task of protecting the knee/shin region of a vehicle occupant when positioned in a manual driving mode and when positioned in an AD mode.

It is further desirable to provide an improved knee airbag arrangement while keeping complexity of the arrangement low.

It is further desirable to provide an improved knee airbag arrangement which occupies a limited space in an effective way, since available packing volume in the vehicle is limited.

Thus, the present invention relates to a knee airbag arrangement for a vehicle. The knee airbag arrangement comprises an inflatable airbag and an external tether. The airbag is adapted to be inflated to a position between an instrument panel of the vehicle and a knee/shin region of a vehicle occupant. The airbag is adapted to form a first deployment mode or a second deployment mode when in a deployed state. The external tether controls deployment of the airbag to the second deployment mode. The depth of the airbag in the second deployment mode is greater than a depth of the knee airbag in the first deployment mode. A depth of the airbag in a deployed state is a greatest extent of the airbag perpendicular to the instrument panel in said knee/shin region.

A knee airbag arrangement as recited above implies a knee airbag arrangement which has a dual-mode function. This, for instance, has the advantageous effect that with the same set-up, i.e. a single airbag housing, inflator and airbag, two different deployed configurations of the knee airbag may be achieved, thus rendering a protective effect in two different modes, preferably a manual driving mode and an AD mode, as will be further explained below.

The external tether is situated exteriorly to the inflated airbag. The external tether, as will be detailed below, connects to an exterior surface of the airbag, as opposed to an inside of, or within, the inflated volume of the airbag.

The knee airbag arrangement may comprise a selection means for selecting the first and/or second deployment mode.

The purpose of a knee airbag arrangement is to protect the knee/shin region of a seated occupant from harmful interaction with the instrument panel of the vehicle, by providing an initial impact surface for the knee/shin region of the vehicle occupant during a collision. To this end, the greater depth of the knee airbag, as described herein, in the second deployment mode implies the advantageous effect of a knee airbag that may provide an early interaction between the knee/shin region of a vehicle occupant seated further to the rear in the vehicle along the longitudinal direction, and the airbag.

The depth of the airbag in the first and second deployment modes, respectively, may correspond to a minimum and a maximum depth of the airbag, respectively. It is envisaged that the airbag may be adapted to form any number of deployment modes for which respective deployment mode, the depth of the airbag falls within a range from the minimum depth to the maximum depth. It may even be envisaged that the number of deployment modes between said first and second deployment mode may be infinite.

Directions as used herein relate to known extensions and directions of a vehicle. As such, the vehicle extends in a longitudinal direction, a lateral direction and a height direction, which directions are perpendicular to each other. The longitudinal direction is the normal driving direction of the vehicle. The lateral direction is a cross direction of the vehicle.

The first or second deployment mode of the knee airbag as described herein may thus be selected depending on the seating position of the vehicle occupant, thus may be seen as corresponding to a manual driving position or an autonomous drive AD position, respectively, of the seated vehicle occupant.

In this context, a manual driving position may correspond to a, as of today, normal driving position of the vehicle occupant. As such, a manual driving position may comprise a range of seating positions, corresponding to a normal adjustment range of the vehicle seat, within which the vehicle occupant freely makes comfort adjustments based on personal criteria and/or size. Within this adjustment range, the vehicle occupant is positioned such that the seated vehicle occupant is intended to operate a steering wheel and pedals in order to actively drive the vehicle.

An AD position may correspond to a seating position of the vehicle occupant during autonomous drive of the vehicle. In this context, the vehicle seat may be further adjusted to the rear of the vehicle as seen along a longitudinal direction, i.e. extending further rearwards than the adjustment range of the manual driving position. Thus, this reflects a situation in which the seated vehicle occupant is not actively driving the vehicle, and subsequently the steering wheel and/or pedals do not have to be within operative reach of the seated vehicle occupant. The vehicle seat may further be adjusted to a reclined position for allowing the vehicle occupant to relax or rest while the vehicle is in autonomous drive.

The depth of the knee airbag is a greatest extent of the deployed knee airbag perpendicular to the instrument panel in the knee/shin region. Thus, the depth of the airbag has an extension downwards-rearward along the longitudinal and height directions. Consequently, an increase in depth implies that the airbag fills a larger space, and subsequently extends further rearwards in the vehicle as seen in a longitudinal direction of the vehicle. This may be seen as reflecting a situation in which a vehicle occupant has adjusted his/hers seating position further to the rear in the vehicle, resulting in an larger space between the instrument panel and the knee/shin region of the seated vehicle occupant.

A knee airbag arrangement as recited above, having a second deployment mode which extends further rearwards in the vehicle, implies an airbag that enables an early interaction with the knee/shin region of a vehicle occupant under circumstances when the seated vehicle occupant is positioned further rearwards in the vehicle than during manual driving, such as, as described above, when the vehicle is in AD, i.e. autonomous driving mode.

In the second deployment mode, the depth of the airbag may be at least 10 cm, preferably at least 15 cm, more preferably at least 20 cm, most preferably at least 25 cm, greater than the depth in the first deployment mode. In this way an advantageous early interaction between a vehicle occupant seated further rearwards in the vehicle and the airbag may be achieved.

As previously mentioned, a positive effect of the knee airbag arrangement is that the same set-up may be used in two different deployment modes, i.e. a single inflator that inflates a single airbag. The airbag has the same inflatable volume in both deployment modes, e.g. the same airbag is inflated in both deployment modes. The airbag will in the first deployment mode deploy to its full extension, assuming a first shape. In the second deployment mode, being controlled by the external tether, the shape of the airbag will be adapted to provide a greater depth of the airbag. The external tether is thus only active in, i.e. controlling the airbag, in the second deployment mode.

The external tether is connected to the airbag to restrict and thereby shape the airbag in the second deployment mode, which tether controls the deployment and thus the location of the airbag when deployed. In this way, the greater depth may be provided.

A configuration of the knee airbag arrangement in this way implies that the external tether is adapted to control deployment of the airbag such that it provides or contributes the greater depth of the airbag. By controlling deployment of the airbag, the external tether adapts the shape of the airbag. In other words, by adapting the shape the airbag, the location of the airbag may be shifted and subsequently the depth of the airbag. As such, the external tether controlling deployment of the airbag implies that the knee airbag arrangement will assume a deployed state that will have greater depth than if no restriction is applied on the airbag by the external tether. Thus, in the second deployment mode the external tether controls the airbag to adapt a shape with a greater depth of the airbag. This implies that the knee airbag arrangement may assume two different configuration, or shapes, of which one extends further rearwards in the longitudinal direction than the other.

Thus, a tether as used herein implies that it functions as a means for selectively position the deployed airbag in the second deployment mode. As such, it primarily does not inflict or change the inflated volume, but instead forces the inflated volume to adapt to a certain shape.

The external tether may be adapted to connect a top end or a top portion of the airbag to a lower end or a lower portion of the airbag or to a support structure that anchors the lower end or lower portion of the airbag to the vehicle, in the second deployment mode. This is advantageous since it implies that the tether will work as to bring the ends of the deployed airbag closer to each other than in the first deployment mode, restricting the full extension of the airbag and instead forcing at least a portion of the airbag to adapt into a curved shape, i.e. a circle segment, e.g. semi-circle, or an arched shape or folded shape. In this way, the greater depth of the airbag in the second deployment mode is provided.

As already mentioned, the external tether is connected exteriorly to the airbag. The top end of the airbag is the end of the top portion. It is the most distal point of the airbag from the inflation point. Thus, the external tether may be connected within a top region of the airbag. In a similar manner, the lower end of the airbag is the end of the lower portion. The lower end of the airbag may correspond to the inflation point of the airbag. At this end the airbag is anchored in the airbag housing, and hence the tether may be anchored to the housing, i.e. the support structure for the airbag.

As may be understood, there may be a range of appropriate locations of the connection at each end for the external tether, still achieving the effect of bringing the ends together and forcing at least a portion of the airbag to adapt into a curved shape, i.e. a circle segment, e.g. semi-circle, or an arched shape or folded shape.

By way of example, the respective connections of the external tether may be spaced apart with a distance of at least 30% of the full extension length of the deployed airbag, preferably with a distance of at least 60% of the full extension length of the deployed airbag, more preferably with a distance of at least 90% of the full extension length of the deployed airbag. It may be that the connections of the external tether are spaced apart the full extension length of the deployed airbag, thus corresponding to the external tether being connected at the ends of the airbag, as described above.

It is envisaged that the airbag, without influence of the external tether, may correspond to a current, existing configuration of an airbag, as will be further detailed below, whilst the external tether may be selectively used to control deployment of the airbag to achieve a second deployment mode as defined herein.

The knee airbag arrangement as described herein preferably relates to a multi-chamber airbag for protection of the knee/shin region of vehicle occupants. The multi-chamber airbag comprises or consists of a plurality of chambers being in fluid communication with one another. Thus, one or more of the chambers of the airbag are arranged sequentially one after the other, so as to be consecutively filled, from a single inflator. The airbag is in its undeployed state stored in a housing, or module, commonly positioned in the lower part or in the underside of the instrument panel, above the foot well. Upon activation of the deployment of the airbag, it deploys along the instrument panel, in the space between the instrument panel and the knee/shin region of the vehicle occupant. Thereby, in a first deployment mode as described herein, the chambers of the airbag deploy along the instrument panel to its full extension. The knee airbag will in this way have a main deployment direction extending along the instrument panel. When viewed from the side of the vehicle, the knee airbag would thus be seen as unfolding upwards-rearwards in the vehicle. The airbag also has an extension in the transversal direction of the vehicle.

The knee airbag arrangement may comprise any number of external tethers as described herein. Since the airbag has a transversal extension, the plurality of external tethers may be spaced apart along the transversal direction of the deployed airbag. External tethers may also be spaced along the deployment direction.

It is envisaged that the first deployment mode of the airbag as described above, without influence of the external tether, may provide the appropriate protective effect for the vehicle occupant seated in a manual driving position. Following this reasoning, the second deployment mode, in which the external tether forces the airbag to achieve a greater depth, may provide appropriate protective effect for the vehicle occupant seated in an AD position as defined herein.

Thus, the external tether is adapted to selectively control the shape and location of the knee airbag in the second deployment mode, preferably, such that at least a portion of the airbag extends further rearward in the longitudinal direction of the vehicle than in the first deployment mode.

In view of the multi-chamber airbag as described above, the respective connections of the external tether may be seen as spaced apart by at least one chamber, preferably by at least two chambers, more preferably by at least three chambers, thereby achieving the desired effect of shaping the airbag and thus extending at least a portion of the airbag further rearward in the longitudinal direction of the vehicle than in the first deployment mode.

The external tether may comprise a first attachment to the top end or top portion of the airbag and a second attachment to the lower end or lower portion of the airbag or to the support structure that anchors the lower end or lower portion of the airbag to the vehicle. Further, the external tether may be selectively releasable. In the first deployment mode the external tether may be released from the airbag at at least one of the first and second attachments. In this way, the tether will not restrict the deployment of the airbag, which will assume a deployed mode, and location, without influence of the external tether, i.e. the first deployment mode.

The external tether may be attached by stitching, e.g. by tear seam. The tear seam may also comprise of constitute the selection means.

As an alternative or complement to releasing the external tether at an attachment, the external tether may comprise a selectively releasable extension portion. In the first deployment mode, the extension portion is released, thereby increasing an operative length of the external tether. In this way, the operative length of the external tether may be increased to such an extent that the external tether will not apply any force to airbag when it is fully extended, and subsequently will assume a deployed mode, and location, without influence of the external tether.

The operative length is the portion of the tether that extends between the first and second attachments of the external tether. Hence, the operative length of the external tether is the part of the tether influencing the deployment of the airbag.

The extension portion may form a fold or a loop of the external tether, the fold or loop being releasably attached to the rest of external tether. Upon releasing the extension portion, the operative length of the external tether is increased by the length of the extension portion.

The extension portion may, if not attached to a location on the rest of the external tether, by way of example be attached to the airbag housing or some part thereof. Noticeably, the extension portion may be adapted to be attached such that a deployed state of the airbag in which the extension portion still attached, i.e. not released, is enabled.

It is envisaged that the external tether may comprise a plurality of extension portions, e.g. formed as folds or loops of the external tether, as described above. Each extension portion may be individually releasably attached, e.g. by tear seam. In this way, the operative length of the external tether may be controlled, and thereby the shape of the airbag, in a number of deployment modes corresponding to the number of extension portions.

The operative length of the external tether in the first deployment mode may define a maximum length and the operative length of the external tether in the second deployment mode may define a minimum length. The operative length of the external tether in the envisaged plurality of deployment modes may be within this range.

As previously described, the external tether connecting the two ends of the airbag implies that the tether will work as to bring the ends of the airbag closer to each other, thereby forcing the airbag to adapt into a curved shape, i.e. a circle segment, e.g. semi-circle, or an arched shape or folded shape. The curved shape will cause at least a portion of the deployed airbag to extend further rearwards than if the airbag was not restricted by the tether. It may be seen as the operative length of the external tether controls the degree to which the airbag is curved. The shorter operative length of the external tether the more curved the airbag will be, since it brings the ends of the airbag closer to each other. Subsequently at least a portion of the airbag will extend further rear in the longitudinal direction. Furthermore, the curved portion constitutes an impact surface for the knee/shin region of the vehicle occupant.

The external tether may comprise or consist of a strap, or a wire, or a panel. The tether may be of a material such as textile, plastics and or metal wire. The external tether may also be of the same material as the airbag itself.

The external tether may be arranged to be situated in a space between the instrument panel and the airbag when the airbag is in the first or the second deployment mode. This has the positive effect of causing the deployed airbag to adapt into a convex shape as viewed from the instrument panel, in said second deployment mode. In this way, the shaped airbag forms the initial impact surface for the knee/shin region of the seated vehicle occupant during a collision. An additional positive effect is that in the first deployment mode, the vehicle occupant is protected from contact with a slack, and possibly loose external tether.

The external tether may also be arranged to be located in a space between the airbag and the knee/shin region of the vehicle occupant when the airbag is in the first or the second deployment mode. This, for instance, results in that the above-described curved shape of the deployed airbag will be inverted to a concave shape, as compared to if the external tether is situated at the opposite side, as described above. In this case, the knee/shin region of the vehicle occupant may interact with at least a portion of the external tether itself, in addition to contact with the surface of the airbag.

In this case, the external tether may preferably be a panel. The panel may constitute a significant part of the initial impact surface and thus being sized to receive at least part of the knee/shin region of the seated vehicle occupant. It is envisaged that the panel may, in part, represent a first contact surface for the knee/shin region of the vehicle occupant, and subsequently, the panel and knee/shin region of vehicle occupant will impact the rest of the airbag.

The selection means may be adapted for selectable release of the external tether and/or selectable release of the extension portion.

The selection means may comprise or consist of tear seam. This is advantageous since it enables an easy and simple way of carrying out a selection of releasing an attachment. Tear seams may constitute the first and second attachments of the external tether and the releasable attachment of the extension portion. The tear seams may further be adapted to be opened, i.e. torn, by an activation means.

The activation means for activating the selection means may comprise or consist of a pyrotechnical release, such as an exploding fastener. Thus, the tear seam may be connected to a pyrotechnical release, in a manner known to the skilled person. By way of example, the pyrotechnical release may in turn be wired to a control unit. Upon receiving an electrical signal from the control unit, indicating a selection has been made to open a tear seam, the pyrotechnical release is activated and thus opens the tear seam.

In an undeployed state of the knee airbag, the tear seams of the first and second attachments, as well as the tear seam of the attachment of the extension portion are intact, i.e. closed. Upon activation of the knee airbag arrangement, a selection of the first or second deployment mode is made, and the appropriate selections means are activated by activation means prior to, or together with, deployment of the airbag. The activation means may also be activated during deployment of the airbag.

The present invention also relates to a vehicle comprising an instrument panel and a knee airbag arrangement as described herein, which comprises an inflatable airbag being adapted to be inflated to a position between said instrument panel of said vehicle and a knee/shin region of a vehicle occupant.

The vehicle may be an autonomous drive vehicle, i.e. an AD vehicle.

The vehicle may comprise at least one sensor for detecting a position of a seated vehicle occupant. The output of the sensor may be used as a basis to control selectable deployment of the first or second deployment mode.

As previously described the position of the vehicle occupant may refer to if the vehicle occupant is seated in within a normal driving adjustment range, or, if the vehicle occupant is seated further to the rear than the normal driving adjustment range, as envisaged during AD. The position of the vehicle occupant may be detected using any kinds of detection means such as camera(s) and/or other types of sensors, such as radar, LIDAR and seat position sensors. It is anticipated that, independent to the detection means, it is the distance between the instrument panel and the knee/shin region of the seated vehicle occupant that is of relevance in selecting deployment mode. Noticeably, detecting the position of the seated vehicle occupant may directly or indirectly provide the distance described above.

The present invention also relates to a method for deploying an airbag of a knee airbag arrangement as described herein. The method comprises detecting a position of a seated vehicle occupant, based on the detected position, selecting the first deployment mode or the second deployment mode of the knee airbag, and based on the selection, deploying the airbag according to the first deployment mode or the second deployment mode.

A method as recited above implies the positive effect of a dual-functioning knee airbag arrangement. Depending on the seated position of the vehicle occupant a first or second deployment mode is selected.

The method may comprise, in case the knee airbag arrangement comprises selection means, selecting the first deployment mode or the second deployment mode of the airbag by means of the selection means.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DESCRIPTION OF EMBODIMENTS

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

The present invention and its advantage over the prior art will be further explained with reference to FIGS. 1 to 5. Directions as used herein relate to known extensions and directions of and in a vehicle. As such, the vehicle extends in a longitudinal direction X, a lateral direction and a height direction Z, which directions are perpendicular to each other, see FIG. 1a. The longitudinal direction X is the normal driving direction of the vehicle. The lateral direction is a cross direction of the vehicle and thus not illustrated.

Figure 1A:
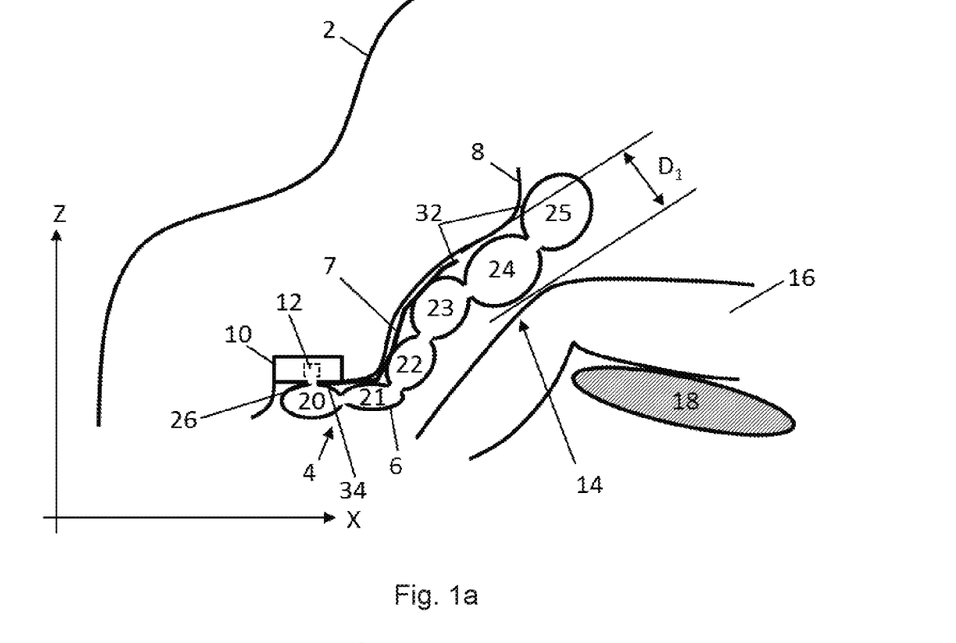
FIGS. 1a and b illustrate a first and a second deployment mode of a knee airbag arrangement according to the present invention.
Figure 1B:
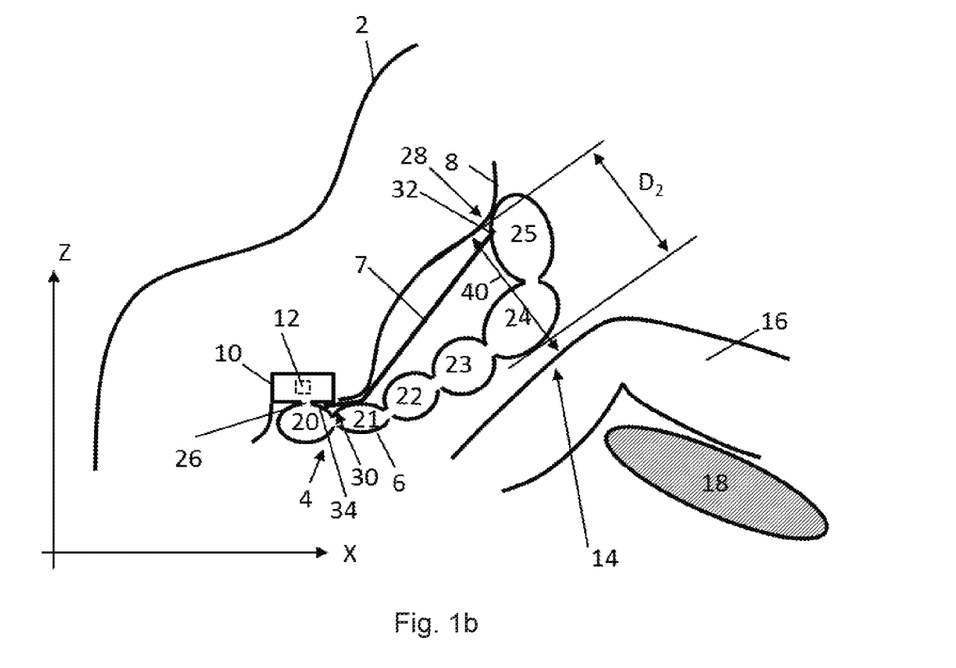

FIGS. 1a and 1b schematically illustrate a vehicle 2 comprising a knee airbag arrangement 4 according to an embodiment of the present invention. The knee airbag arrangement 4 comprises an airbag 6, deployed in two different deployment modes, and an external tether 7. FIG. 1a shows a first deployment mode and FIG. 1b shows a second deployment mode. The vehicle 2 is only schematically depicted. The vehicle may be an AD vehicle. An instrument panel 8 is also schematically depicted. The knee airbag arrangement 4 comprises a housing 10 in which the inflatable airbag, when undeployed, and an inflator 12 for inflating and deploying the airbag, are stored. The inflator 12 is schematically illustrated in the housing 10. As illustrated, the airbag 6 is adapted to inflate and thereby deploy to a position between the instrument panel 8 and a knee/shin region 14 of a seated vehicle occupant 16. Only a lower extremity of a vehicle occupant 16 seated in a vehicle seat 18 of the vehicle is depicted, the vehicle seat 18 is schematically illustrated. The airbag 6 is operatively connected to the inflator 12 for receiving gas therefrom.

The housing 10 is illustrated in FIGS. 1a and 1b at an underside of the instrument panel 8, but may also be located at a lower portion of the instrument panel, depending on the configuration of the instrument panel.

The airbag 6 is depicted as a multi-chamber airbag. Thus, a plurality of separate chambers 20, . . . , 25 is formed in the airbag 6. The chambers 20, . . . , 25 are schematically depicted as ovals in FIGS. 1 to 3. The chambers are separated by partitions formed inside the airbag. The partitions have through-ports or holes or openings for the gas to flow between the chambers. The airbag 6 inflates through a deployment opening 26 located in the underside of the instrument panel 8. The airbag 8 in FIGS. 1a and 1b is illustrated with six deployed chambers 20, . . . , 25. Noticeably, the airbag 6 may comprise any number of chambers or be comprised of a single chamber.

The airbag 6 has been forced to adapt into a different shape by the external tether 7, in the second deployment mode, see FIG. 1b, as compared to the first deployment mode, see FIG. 1a. Hence, the external tether 7 controls deployment of the airbag 6 to the second deployment mode. The external tether 7 is situated exteriorly to the inflated airbag 6. Hence, the external tether connects to an exterior surface of the airbag.

As is known to the skilled person, upon detection of a crash condition requiring deployment of the airbag, an actuation circuit is to be directed by a controller to initiate deployment of the airbag.

Upon activation of the deployment of the airbag 6, it deploys along the instrument panel 8, in the space between the instrument panel 8 and the knee/shin region 14 of the vehicle occupant. In a first deployment mode as described herein, the chambers 20, . . . , 25 of the airbag 6, deploy along the instrument panel 8 to its full extension. The airbag 6 will in this way be seen as having a main deployment direction extending substantially along the instrument panel, in the first deployment mode, see FIG. 1a. When viewed from the side of the vehicle, the knee airbag would thus be seen as deploying upwards-rearwards in the vehicle. The airbag also has an extension in the transversal direction of the vehicle.

A depth $D_1$, $D_2$ of the airbag 6 in a deployed state is a greatest extent of the airbag 6 perpendicular to the instrument panel 8 in said knee/shin region 14, see FIGS. 1a and 1b. The depth $D_2$ of the airbag 6 in the second deployment mode is greater than the depth $D_1$ of the airbag 6 in the first deployment mode, see FIGS. 1a and 1b. Thus, the depth $D_1$, $D_2$ of the airbag 6 extends rearwards-downwards, along the longitudinal direction X and height direction Z. As illustrated, the knee/shin region 14 is further rearwards in FIG. 1b in relation to the instrument panel 8, as compared to in FIG. 1a. Hence, in the second deployment mode, the desired early interaction between the knee/shin region 14 of the vehicle occupant and airbag 6 may be achieved through the greater depth $D_2$ of the airbag 6.

The knee airbag arrangement as described thus implies a dual-mode function. This, for instance, has the advantageous effect that with the same set-up, i.e. a single airbag housing, inflator and airbag, two different deployed configurations of the airbag may be achieved, thus rendering a protective effect in two different modes, preferably a manual driving mode and an AD mode.

The knee airbag arrangement as illustrated, having a second deployment mode which extends further rearwards in the vehicle, implies an airbag that enables an early interaction with the knee/shin region of a vehicle occupant under circumstances when the seated vehicle occupant is positioned further rearwards in the vehicle than the adjustment range of the manual driving position, such as, when the vehicle is in AD.

It is envisaged that the airbag 6, without influence of the external tether 7, see FIG. 1a, may correspond to a current, existing configuration of an airbag, whilst the external tether 7 may be selectively used to control deployment of the airbag 6 to the second deployment mode as defined herein.

In the second deployment mode, the depth $D_2$ of the airbag 6 may be at least 10 cm, preferably at least 15 cm, more preferably at least 20 cm, most preferably at least 25 cm, greater than the depth $D_1$ in the first deployment mode. In this way an advantageous early interaction between a vehicle occupant 16 seated further rearwards in the vehicle 2 and the airbag 6 may be achieved. By comparison, if instead using an current, existing, airbag configuration for deployment in this situation, e.g. when the vehicle occupant is seated further to the rear than the adjustment range of the vehicle seat in manual driving mode, it would be apparent that a significant gap, or space, would remain between the deployed and fully extended airbag and the knee/shin region of the seated vehicle occupant.

The knee airbag arrangement 4 comprises an external tether 7, see FIGS. 1a and 1b. The external tether 7 controls deployment of the airbag 6 to the second deployment mode. First, focus will be put on explaining the second deployment mode illustrated in FIG. 1b. The external tether 7 is connected to the airbag 6 for controlling deployment of the airbag 6 in the second deployment mode, which thereby controls the location of the airbag 6, as is illustrated FIG. 1b. The knee airbag arrangement 4 may comprise any number of external tethers 7 as described herein. Since the airbag 6 has a transversal extension, the plurality of external tethers 7 may be spaced apart along the transversal direction of the deployed airbag 6, but also along the deployment direction.

It is readily understood from FIG. 1b that the external tether 7 restricts the full extension of the deployed airbag 6, as compared to the first deployment mode in FIG. 1a, and instead forces at least a portion of the airbag to adapt a curved shape, or arched shape. In this way, the greater depth $D_2$ of the airbag 6 in the second deployment mode is provided. As shown in FIG. 1b, the external tether 7 connects a top portion 28 of the airbag 6 to a lower portion 30 of the airbag 6. In this way, the external tether 7 will work as to bring the ends of the deployed airbag 6 closer to each other than in the first deployment mode, see FIG. 1a, restricting the full extension of the airbag 6 and instead forcing the airbag 6 to adapt into a curved shape, i.e. a circle segment. The curved shape may also be a folded shape or an arched shape. The curved shape will cause at least a portion the airbag 6 to extend further rearwards than if the airbag 6 is not restricted by the external tether 7. In other words, by adapting the shape of the airbag 6 the location of the airbag shifts and subsequently the depth $D_2$ of the airbag 6 is increased.

The external tether 7 is situated exteriorly to the airbag 6. The top end of the airbag is the end of the top portion 28. It is the most distal point of the airbag 6 from the inflation point, located at the deployment opening 16. Thus, the external tether 7 may be connected within a top region of the airbag 6, i.e. to a top end or top portion 28 of the airbag. In a similar manner, the lower end of the airbag is the end of the lower portion 30. Thus, the external tether 7 may be connected to the lower end or lower portion 30 of the airbag 6. The lower end of the airbag may correspond to the inflation point of the airbag 6. At this end the airbag 6 is anchored in the airbag housing 10, and hence the external tether 7 may be anchored to the housing 10, forming the support structure for the airbag 6. Hence, there may be, at each end of the airbag, a range within which the connections of the external tether may be located, whilst still achieving the effect of bringing the ends of the airbag 6 together and forcing the airbag 6 to adapt in to a curved shape, i.e. a circle segment, e.g. semi-circle, or an arched shape or folded shape.

By way of example, the respective connections of the external tether may be spaced apart with a distance of at least 30% of the full extension length of the deployed airbag, preferably with a distance of at least 60% of the full extension length of the deployed airbag, more preferably with a distance of at least 90% of the full extension length of the deployed airbag. It may be that the connections of the external tether are spaced apart the full extension length of the deployed airbag, thus corresponding to the external tether being connected at the ends of the airbag, as described above.

By way of another example, in view of the multi-chamber airbag as described above, the respective connections of the external tether may be seen as spaced apart by at least one chamber, preferably by at least two chambers, more preferably by at least three chambers, thereby achieving the desired effect of shaping the airbag and thus extending at least a portion of the airbag further rearward in the longitudinal direction of the vehicle than in the first deployment mode.

By controlling deployment of the airbag 6, the external tether 7 adapts the shape of the airbag 6. In other words, by adapting the shape the airbag 6, the location of the airbag 6 may be shifted and subsequently the depth $D_2$ of the airbag 6 increased.

Thus, the external tether 7 as used herein implies that it functions as a means for selectively position the deployed airbag 6 in the second deployment mode. As such, it does not inflict or change the inflated volume of the airbag 6, but instead forces the inflated volume to adapt to a certain shape.

The external tether 7 in FIGS. 1a and 1b is situated in a space between the instrument panel 8 and the deployed airbag 6. This causes the airbag 6 in the second deployment mode to adapt into a convex shape as viewed from the instrument panel 8. In this way, the shaped airbag 6 constitutes the initial impact surface for the knee/shin region 14 of the seated vehicle occupant 16 during a collision.

As an alternative, the external tether 7 may be situated in a space between the deployed airbag 6 and the knee/shin region 14 of the seated vehicle occupant 16. In this way, the external tether 7 may force the airbag 6 into a concave shape as viewed from the instrument panel 8. This will be further explained below with reference to FIG. 3.

Reverting to FIGS. 1a and 1b, it may be gleaned that the external tether 7 may be connected by a first attachment 32 to the top end or top portion 28 of the airbag 6 and by a second attachment 34 to the lower end or lower portion 30 of the airbag 6 or to the support structure 10 that secures the lower end or lower portion 30 of the airbag 6. The external tether 7 may be selectively releasable, as illustrated in FIG. 1a.

In the first deployment mode, see FIG. 1a, the external tether 7 has been released at the first attachment 32. The external tether 7 is still connected at its second attachment 34. Thus, the external tether 7 is slack, but still connected to the knee airbag arrangement 4. In this way, the external tether 7 will not restrict the deployment of the airbag 6, which will assume a deployed mode, and location, without influence of the external tether 7, i.e. the first deployment mode.

The external tether 7 may as an alternative or complement, be released at the second attachment 34.

The external tether may be attached by stitching, e.g. by tear seam. The tear seam may also comprise or constitute a selection means, which will be further detailed below.

As an alternative or complement to releasing the external tether 7 at an attachment 32, 34, the external tether 7 may comprise a selectively releasable extension portion. In the first deployment mode, the extension portion is released, thereby increasing an operative length of the external tether 7. In this way, the operative length of the external tether 7 is extended to such an extent that it is slack when the deployed airbag 6 has fully extended, and thereby does not influence the deployment, and shape, of the airbag 6, i.e. the first deployment mode, which is shown in FIG. 2.

The operative length of the external tether 7 is the portion of the external tether 7 that extends between the first and second attachments 32, 34 of the external tether 7.

Figure 2:
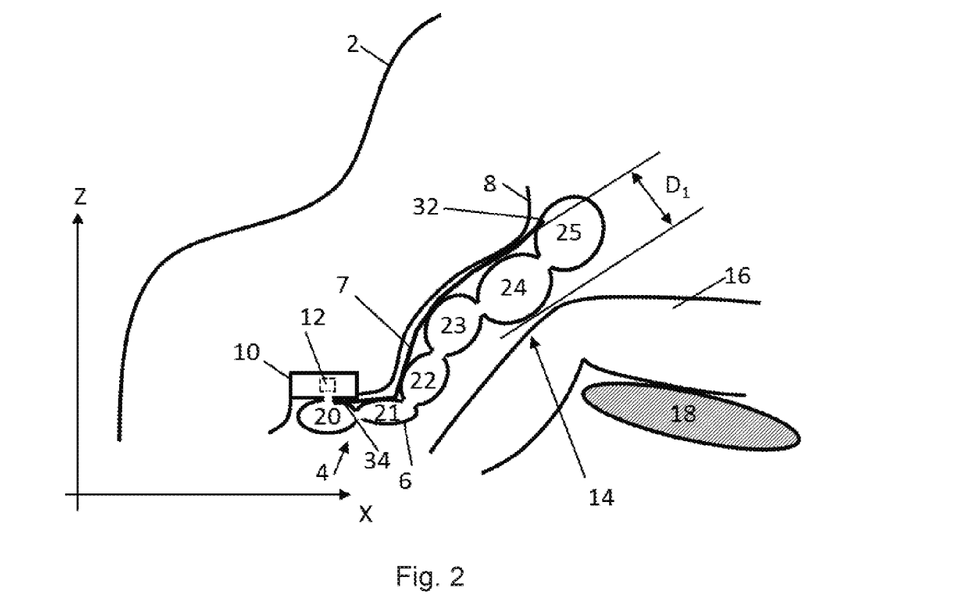
FIG. 2 illustrates another embodiment of a first deployment mode of a knee airbag arrangement according to the present invention.

As shown in FIG. 2, the external tether 7 is still connected by its attachments 32, 34, but does not influence the shape of the airbag 6. The external tether 7 is slack, thus not tensioned. Hence, the length of the extension portion may be adapted such that the release of the extension portion increases the operative length of the external tether 7 to such an extent that the external tether 7 will not affect the shape of the airbag 6, hence it will correspond to as if at least one of the attachments 32, 34 of the external tether 7 was released.

The extension portion may form a fold or a loop of the external tether 7. The fold may be releasably attached, e.g. to the rest of external tether. Upon releasing the extension portion, the operative length of the external tether 7 is increased by the extension portion. Thus the fold forms an extension portion of the external tether that upon release will increase the length of the external tether 7.

The extension portion is illustrated in FIG. 2 as part of the operative length of the external tether 7, hence only in its released state. The extension portion may, if not attached to a location on the rest of the external tether 7, by way of example be attached to the housing 10 or some part thereof.

Noticeably, the extension portion is adapted to be attached such that a deployed state with the extension portion still attached, i.e. not released, is enabled.

It is envisaged that the external tether 7 may comprise a plurality of extension portions, e.g. formed as folds of the external tether 7, as described above. Each extension portion may be individually releasably attached, e.g. by tear seam. In this way, the operative length of the external tether 7 may be controlled, and thereby the shape of the airbag 6, in a number of deployment modes corresponding to the number of extension portions. The operative length of the external tether 7 in the first deployment mode may define a maximum operative length and the operative length of the external tether 7 in the second deployment mode may define a minimum operative length. The operative length of the external tether 7 in the envisaged plurality of deployment modes may be within this range.

To this end, the operative length of the external tether 7 controls the degree to which the airbag 6 is curved or bent. The shorter operative length of the external tether 7 the more bent or curved the airbag 6 will be, since it brings the ends of the airbag 6 closer to each other. Subsequently at least a portion of the airbag 6 will extend further rear in the longitudinal direction X thereby better filling the gap between the instrument panel 8 and the knee/skin region 14, in case the seated vehicle occupant 16 assumes a position further rearwards in the vehicle 2.

The external tether 7 may comprise or consist of a strap, or a wire, or a panel. The external tether 7 may be of a material such as textile, plastics and or metal wire. The external tether 7 may also be of the same material as the airbag 6 itself.

Figure 3:
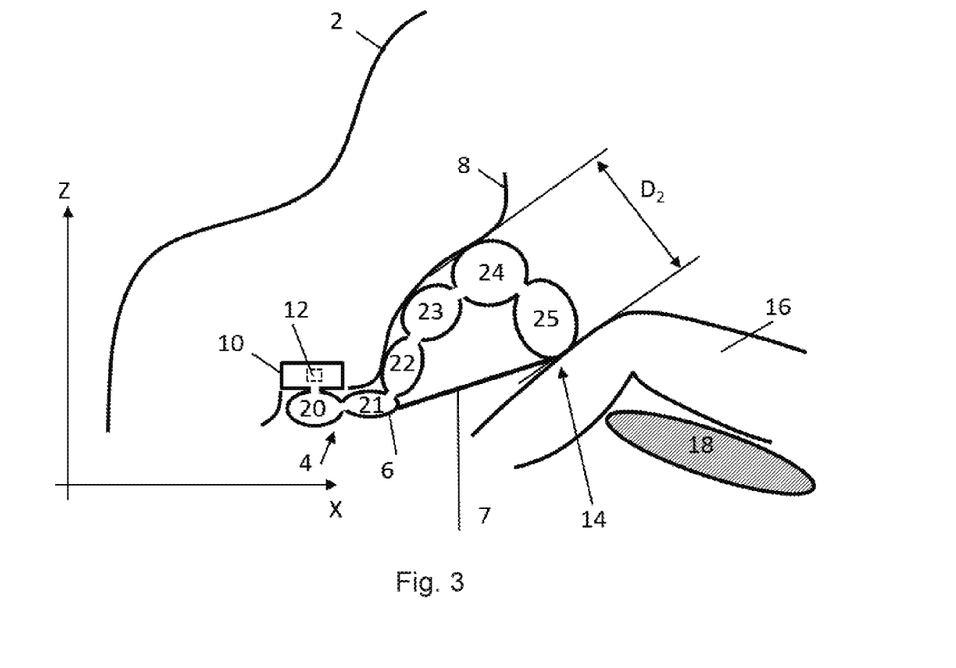
FIG. 3 illustrates another embodiment of a second deployment mode of a knee airbag arrangement according to the present invention.

As mentioned above, the external tether 7 may be located in a space between the airbag 6 and the knee/shin region 14 of the vehicle occupant 16 when the airbag 6 is in a deployed state, illustrated for the second deployment mode in FIG. 3. This causes the airbag 6 to adapt into a curved shape which is inverted to a concave shape compared to if the external tether 7 is situated in a space between the instrument panel 8 and airbag 6, as shown in FIG. 1*b*. From this configuration follows, as shown in FIG. 3, that a significantly smaller part of the airbag 6 will make up the impact surface for the knee/shin region 14 of the vehicle occupant 16. Instead, the external tether 7 may form at least part of an initial impact surface for the knee/shin region 14 of the seated vehicle occupant 16 occupant during a collision.

In case that the external tether 7 extends between the deployed airbag 6 and the knee/shin region 14 of the seated vehicle occupant 16, see FIG. 3, it may be particularly advantageous that the external tether 7 is made up of a panel. The panel may constitute at least a part of the initial impact surface and thus being sized to receive at least part of the knee/shin region 14 of the seated vehicle occupant 16. It is envisaged that the panel may represent a first contact surface and subsequently, the panel and knee/shin region of vehicle occupant will contact the rest of the airbag 6.

The knee airbag arrangement 4 as described herein comprises selection means for selecting the first and/or second deployment mode. The knee airbag arrangement 4 may comprise selection means for selectable release of the external tether 7, as is illustrated in FIG. 1*a*. As an alternative, or as a complement, the knee airbag arrangement 4 may comprise selection means for selectable release of the extension portion, as shown in FIG. 2.

The selection means may comprise or consist of tear seam. This is advantageous since it enables an easy and simple way of carrying out a selection of releasing an attachment. Tear seams may constitute the first and second attachments of the external tether and the releasable attachment of the extension portion. The tear seams may further be adapted to be opened, i.e. torn, by an activation means.

The activation means for activating the selection means may comprise or consist of a pyrotechnical release, such as an exploding fastener. Thus, the tear seam may be connected to a pyrotechnical release, in a manner known to the skilled person. Activating the pyrotechnical release will open the tear seam which will no longer act as an attachment. By way of example, the pyrotechnical release may in turn be wired to a control unit. Upon receiving an electrical signal from the control unit, indicating a selection has been made to open a tear seam, the pyrotechnical release is activated and thus opens the tear seam.

In an undeployed state of the knee airbag, the tear seams of the first and second attachments, and/or the tear seam of the attachment of the extension portion are intact, i.e. closed. Upon activation of the knee airbag arrangement, a selection of the first or second deployment mode is made, and the appropriate selections means are activated by activation means prior to, or simultaneous with, deployment of the airbag. The activation means may also be activated during deployment of the airbag.

Figure 4:
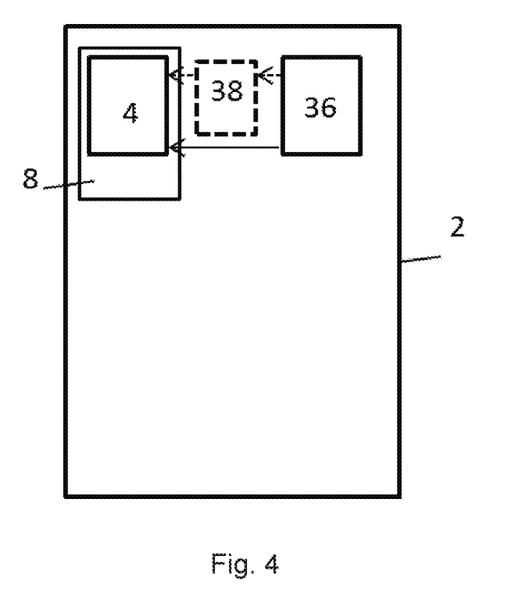
FIG. 4 illustrates a vehicle comprising a knee airbag arrangement according the present invention.

With reference to FIG. 4, a vehicle 2 comprising an instrument panel 8 and a knee airbag arrangement 4 is schematically illustrated. The vehicle 2 further comprises at least one sensor 36 for detecting a position of a seated vehicle occupant. The output of the sensor 36 is used as a basis to control selectable deployment of the first or second deployment mode, as illustrated by the arrow in FIG. 4. This may involve that the first or the second attachment is released, or that the extension portion is released, depending on the embodiment of the airbag. By way of example, a controller 38 is adapted to receive information form the sensor 36, and further is adapted to send a signal to the knee airbag arrangement 4 to actuate deployment of the airbag.

As previously described the position of the vehicle occupant may refer to if the vehicle occupant is seated in within a normal driving adjustment range, or, if the vehicle occupant is seated further to the rear than the normal driving adjustment range, as envisaged during AD. The position of the vehicle occupant may be detected using any kinds of detection means such as camera(s) and/or other types of sensors, such as radar, LIDAR, and seat location sensors. It is anticipated that, independent of means chosen for detection, it is anticipated that it is the distance 40 between the instrument panel and the knee/shin region of the seated vehicle occupant that is of relevance in selecting deployment mode, see FIG. 1*b*. Noticeably, detecting the position of the seated vehicle occupant will directly or indirectly provide the distance 40 described above.

Figure 5:
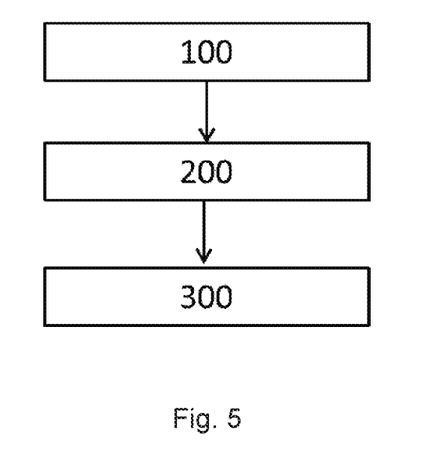
FIG. 5 illustrates a method according to the present invention.

With reference to FIG. 5 a method of deploying an airbag of a knee airbag arrangement according to the present invention will be described. The method comprises:

100: detecting a position of a seated vehicle occupant,

200: based on the detected position, selecting the first deployment mode or the second deployment mode of the airbag, and

300: based on the selected deployment mode, deploying the airbag according to the first or the second deployment mode.

A method as recited above implies the positive effect of a dual-functioning knee airbag arrangement. Depending on the seated position of the vehicle occupant a first or second deployment mode is selected.

With reference to FIG. 5, step 200 of the method may comprise, in case the knee airbag arrangement comprises selection means, selecting the first deployment mode or the second deployment mode of the airbag by means of the selection means.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A knee airbag arrangement for a vehicle, said knee airbag arrangement comprising:
   an inflatable airbag and an external tether, said airbag being adapted to be inflated to a position between an instrument panel of said vehicle and a knee/shin region of a vehicle occupant, wherein said airbag is adapted to alternatively form one of an available first deployment mode and a second deployment mode when in a deployed state, said external tether controlling deployment of said airbag to said second deployment mode, and wherein a depth (D2) of said airbag in said second deployment mode is greater than a depth (D1) of said knee airbag in said first deployment mode, a depth (D1, D2) of said airbag in a deployed state being a greatest extent of said airbag perpendicular to said instrument panel in said knee/shin region.

2. The knee airbag arrangement of claim 1, wherein in said second deployment mode, said depth (D2) of said airbag is at least 10 cm greater than said depth (D1) in said first deployment mode.

3. The knee airbag arrangement of claim 1, wherein said external tether is adapted to connect a top end or a top portion of said airbag to a lower end or a lower portion of said airbag or to a support structure that anchors said lower end or lower portion of said knee airbag to said vehicle, in said second deployment mode.

4. The knee airbag arrangement of claim 3, wherein said external tether comprises a first attachment to said top end or top portion of said airbag and a second attachment to said lower end or lower portion of said airbag or to said support structure that anchors said lower end or lower portion of said airbag to said vehicle, said external tether being selectively releasable, and wherein in said first deployment mode said external tether is released from said airbag at at least one of said first and second attachments.

5. The knee airbag arrangement of claim 1, wherein said external tether comprises a selectively releasable extension portion, and wherein
   in said first deployment mode, said extension portion is released, thereby increasing an operative length of said external tether.

6. The knee airbag arrangement of claim 5, wherein said extension portion forms a fold or a loop of said external tether, said fold or loop being releasably attached to the rest of said external tether, and wherein upon releasing said extension portion, said operative length of said external tether is increased by said extension portion.

7. The knee airbag arrangement of claim 1, wherein said external tether comprises or consists of a strap, a wire or a panel.

8. The knee airbag arrangement of claim 1, wherein said external tether is arranged to be situated in a space between said instrument panel and said airbag when said airbag is in said first or second deployment mode.

9. The knee airbag arrangement of claim 1, wherein said knee airbag arrangement comprises a selection means for selecting said first and/or said second deployment mode.

10. The knee airbag arrangement of claim 9, wherein said selection means are adapted for selectable release of said external tether.

11. The knee airbag arrangement of claim 9, wherein said selection means comprises or consists of tear seam.

12. A vehicle comprising an instrument panel and a knee airbag arrangement according to claim 1 comprising an inflatable airbag, said airbag being adapted to be inflated to a position between said instrument panel of said vehicle and a knee/shin region of a vehicle occupant.

13. The vehicle according to claim 12, said vehicle further comprising at least one sensor for detecting a position of a seated vehicle occupant, the output of said sensor being used as a basis to select said first or second deployment mode.

14. A method for deploying an airbag of a knee airbag arrangement according to claim 1, said method comprising:
   (a) detecting a position of a seated vehicle occupant,
   (b) based on said detected position, selecting said first deployment mode or said second deployment mode of said airbag, and
   (c) based on said selection, deploying said airbag according to said first deployment mode or said second deployment mode.

15. The method of claim 14, wherein step (b) comprises:
   selecting said first deployment mode or said second deployment mode by means of a selection means.

* * * * *